(12) United States Patent
Jibiki et al.

(10) Patent No.: US 10,386,583 B2
(45) Date of Patent: Aug. 20, 2019

(54) OPTICAL CONNECTOR

(71) Applicant: SEIKOH GIKEN Co., Ltd., Matsudo-shi, Chiba (JP)

(72) Inventors: Masayuki Jibiki, Matsudo (JP); Takanori Itagaki, Matsudo (JP)

(73) Assignee: SEIKOH GIKEN Co., Ltd., Matsudo-shi, Chiba (JP)

( * ) Notice: Subject to any disclaimer, the term of this patent is extended or adjusted under 35 U.S.C. 154(b) by 0 days.

(21) Appl. No.: 16/003,119

(22) Filed: Jun. 8, 2018

(65) Prior Publication Data

US 2018/0356602 A1 Dec. 13, 2018

Related U.S. Application Data

(60) Provisional application No. 62/517,172, filed on Jun. 9, 2017.

(51) Int. Cl.
*G02B 6/38* (2006.01)
*G02B 6/245* (2006.01)

(52) U.S. Cl.
CPC .......... *G02B 6/3838* (2013.01); *G02B 6/3858* (2013.01); *G02B 6/245* (2013.01)

(58) Field of Classification Search
CPC .. G02B 6/3838; G02B 6/3858; G02B 6/3846; G02B 6/3893; G02B 6/3894; G02B 6/3871; G02B 6/3873; G02B 6/3821
See application file for complete search history.

(56) References Cited

U.S. PATENT DOCUMENTS

| | | | | |
|---|---|---|---|---|
| 5,436,995 A * | 7/1995 | Yoshizawa | ............ | G02B 6/3869 385/136 |
| 5,953,476 A * | 9/1999 | Abe | ............ | G02B 6/3887 385/69 |
| 6,206,581 B1 * | 3/2001 | Driscoll | ............ | G02B 6/3843 385/139 |
| 8,342,755 B2 * | 1/2013 | Nhep | ............ | G02B 6/3887 385/78 |
| 8,459,877 B2 * | 6/2013 | Barnes | ............ | G02B 6/245 385/134 |
| 8,690,454 B2 | 4/2014 | Tamekuni et al. | | |
| 9,235,010 B2 * | 1/2016 | Islam | ............ | G02B 6/3887 |

(Continued)

FOREIGN PATENT DOCUMENTS

JP  5369053 B  12/2013

*Primary Examiner* — Ryan A Lepisto
*Assistant Examiner* — Erin D Chiem
(74) *Attorney, Agent, or Firm* — Yokoi & Co., U.S.A.; Toshiyuki Yokoi

(57) ABSTRACT

When a second housing 80 and a first housing 30 are approached to each other along an axial direction, a body portion 62 of a second fixing member 60 begins to enter in an opening 81 of the second housing 80. Since a vertical wall surface 81a and a cylindrical surface 81b are formed on the opening 81 to substantially match the outer shape of the rear end of the body portion 62, when the second housing 80 is inserted to the first housing 30 while keeping the relative angle until the second housing 80 abuts on a first fixing member 40 which closes the opening and rotating the second housing 80 with respect to the first housing 30 by 90°, a protrusion 64 faces and enters a recessed engagement portion 83 formed on the vertical wall surface 81a. Thus, the protrusion 64 and the recessed engagement portion 83 are fitted and fixed.

7 Claims, 24 Drawing Sheets

(56) References Cited

U.S. PATENT DOCUMENTS

| | | | | |
|---|---|---|---|---|
| 9,268,102 B2* | 2/2016 | Daems | ............... | G02B 6/3809 |
| 2002/0090179 A1* | 7/2002 | Iwano | ............... | G02B 6/3851 |
| | | | | 385/78 |
| 2010/0254663 A1* | 10/2010 | Hopkins | ............ | G02B 6/3887 |
| | | | | 385/78 |
| 2011/0002586 A1* | 1/2011 | Nhep | ............... | G02B 6/3887 |
| | | | | 385/62 |
| 2012/0243832 A1* | 9/2012 | Tamekuni | ............ | G02B 6/3846 |
| | | | | 385/60 |
| 2013/0322826 A1* | 12/2013 | Henke | ............... | G02B 6/3834 |
| | | | | 385/60 |

* cited by examiner

OPTICAL CONNECTOR

CROSS-REFERENCES TO RELATED APPLICATIONS

This patent specification claims priority to U.S. Provisional Application Ser. No. 62/517,172, filed Jun. 9, 2017, the entire contents of which are incorporated by reference herein.

BACKGROUND OF THE INVENTION

1. Field of the Invention

The present invention relates to an optical connector for connecting a built-in fiber held by a ferrule portion with an optical fiber.

2. Description of Related Art

There is used an optical connector which houses a ferrule portion in a front end side of the optical connector and has a fiber connection portion which connects a built-in fiber held by the ferrule portion with an optical fiber exposed by removing an outer jacket.

Conventionally, the optical connector shown in Patent Document 1 is disclosed as this kind of the optical connector. In Patent Document 1, a front end member and a rear end member both made from resin are used for forming an inner housing space as a whole to house the fiber connection portion. The rear side of the front end member is formed in a tubular shape or a columnar shape. A protrusion is formed on an outer surface of the rear side of the front end member. The front side of the rear end member is formed in a tubular shape so that the rear side of the front end member can be inserted into the front side of the rear end member. A recessed portion is formed on the wall surface of the tubular shape of the front side of the rear end member so that the protrusion can be fitted to the recessed portion. The protrusion has an inclined surface gradually protruded from the rear side to the front side of the front end member. The protrusion forms a vertical surface at an area immediately adjacent to the maximumly protruded position. An outer diameter of the rear side of the front end member is approximately coincident with an inner diameter of the front side of the rear end member.

When the rear side of the front end member is inserted into the front side of the rear end member, although the protrusion abuts on the rear end member, the front end member can be inserted into the rear end member by forcedly pressing the front end member since the inclined surface is formed. Thus, the front end member and the rear end member are fitted to each other when the position of the protrusion is aligned with the position of the recessed portion. After they are fitted to each other, the vertical surface abuts on a peripheral surface of the recessed portion to prevent the coming-off.

[Patent Document 1] Japanese Patent No. 5369053

BRIEF SUMMARY OF THE INVENTION

The front end member of the optical connector is connected to another member, and the rear end member is connected to an optical fiber separately. According to the specification, a predetermined bearing force is required for the connection between the front end member and the rear end member so as not to be separated from the another member when they are pulled while the optical fiber is held.

In the above described conventional optical connector, since the members are forcedly fitted, resistance force of the fitting inevitably becomes large to increase the bearing force against the tension. Thus, it was difficult to reduce the resistance force below the level allowable for the assembling work while keeping the necessary bearing force.

The present invention provides an optical connector capable of being assembled easily and having high bearing force against the tension.

The present invention provides an optical connector which houses a ferrule portion in a front end side of the optical connector, the optical connector having a fiber connection portion which connects a built-in fiber held by the ferrule portion with an optical fiber exposed by removing an outer jacket, the optical connector has a first housing portion for housing the ferrule portion; and a second housing portion for housing the fiber connection portion, the second housing portion being arranged on a rear side of the first housing portion, wherein the first housing portion and the second housing portion are configured to fit to each other by inserting one of the first housing portion and the second housing portion to the other while aligning in an axial direction and rotating one of the first housing portion and the second housing portion with respect to the other by an angle smaller than one rotation.

In the above described configuration, the first housing portion houses the ferrule portion, and the second housing portion is arranged on a rear side of the first housing portion to house the fiber connection portion.

When assembling, one of the first housing portion and the second housing portion is inserted to the other while aligning in an axial direction and rotated by an angle smaller than one rotation to fit the first housing portion and the second housing portion with each other.

In another embodiment of the present invention, one of the first housing portion and the second housing portion has a tubular engagement portion which is formed in a tubular shape projected toward the other of the first housing portion and the second housing portion in the axial direction for inserting the built-in fiber into the tubular engagement portion, a protrusion protruding to a radius direction is formed on an outer peripheral surface of the tubular engagement portion, the other of the first housing portion and the second housing portion has an engagement receiving portion which can house the tubular engagement portion, has a protrusion-avoiding portion into which the protrusion can be inserted without causing interference, and has a recessed engagement portion formed on an inner peripheral surface of the engagement receiving portion at a part other than the protrusion-avoiding portion, and the recessed engagement portion is arranged at a position capable of facing the protrusion so that the recessed engagement portion and the protrusion are fitted to each other.

When the axial direction of the first housing portion is aligned with that of the second housing portion, the tubular engagement portion and the engagement receiving portion are faced with each other. The engagement receiving portion can house the tubular engagement portion. Although the protrusion protruding to the radius direction is formed on an outer peripheral surface of the tubular engagement portion, since the engagement receiving portion has the protrusion-avoiding portion into which the protrusion can be inserted without causing interference, the tubular engagement portion can be inserted to the engagement receiving portion and housed in it by aligning the position of the protrusion and the protrusion-avoiding portion. Since the recessed engagement portion is formed on an inner peripheral surface of the engagement receiving portion at a part other than the protrusion-avoiding portion and the recessed engagement portion is arranged at a position capable of facing the protrusion, the first housing portion and the second housing portion are fitted to each other by inserting the tubular engagement portion to the engagement receiving portion and rotating it by an angle smaller than one rotation until the protrusion faces the recessed engagement portion.

Note that the built-in fiber is inserted through the tubular engagement portion and the engagement receiving portion which are formed in a tubular shape in the axial direction at the other side.

The optical connector of the present invention is fitted by the rotation with an angle smaller than one rotation without being forcedly fitted. Thus, assembling work is easy and bearing force is high against the tension. When the tubular engagement portion having the protrusion at a periphery and the engagement receiving portion having the protrusion-avoiding portion are provided, the protrusion can be inserted without causing interference and the first housing portion can be fitted to the second housing portion only by rotating the protrusion until it faces the recessed engagement portion by an angle smaller than one rotation.

DETAILED DESCRIPTION OF THE INVENTION

Hereafter, the embodiments of the present invention will be explained based on the drawings.

Figure 1:
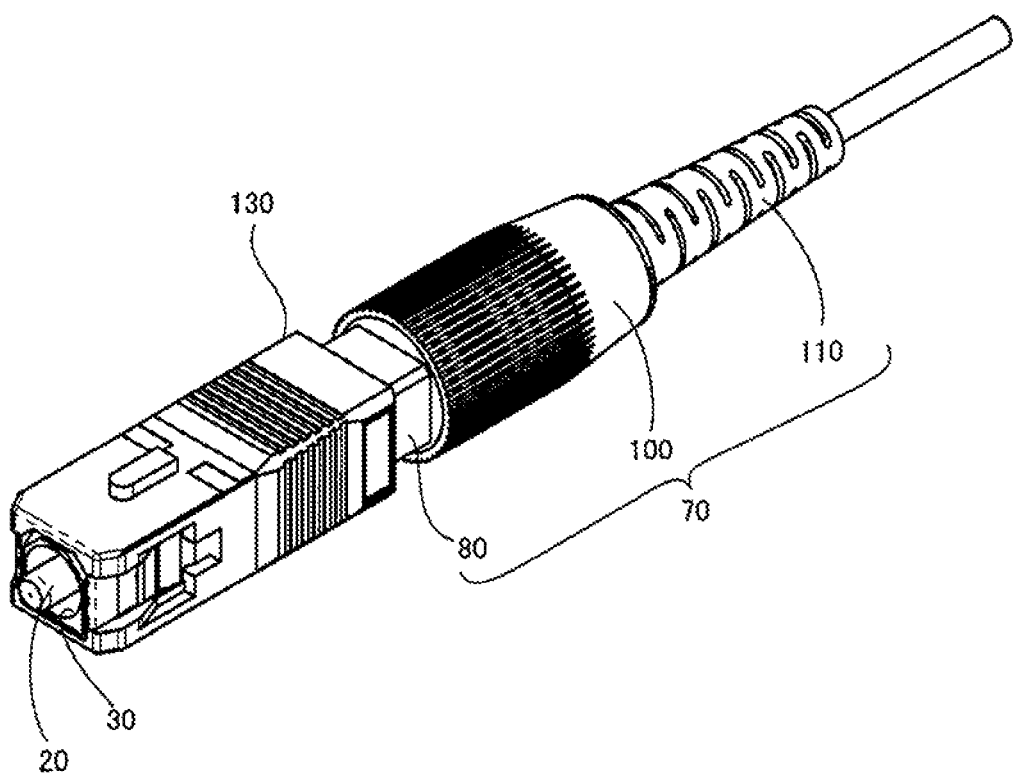
FIG. 1 is a perspective view of an optical connector.
Figure 2:
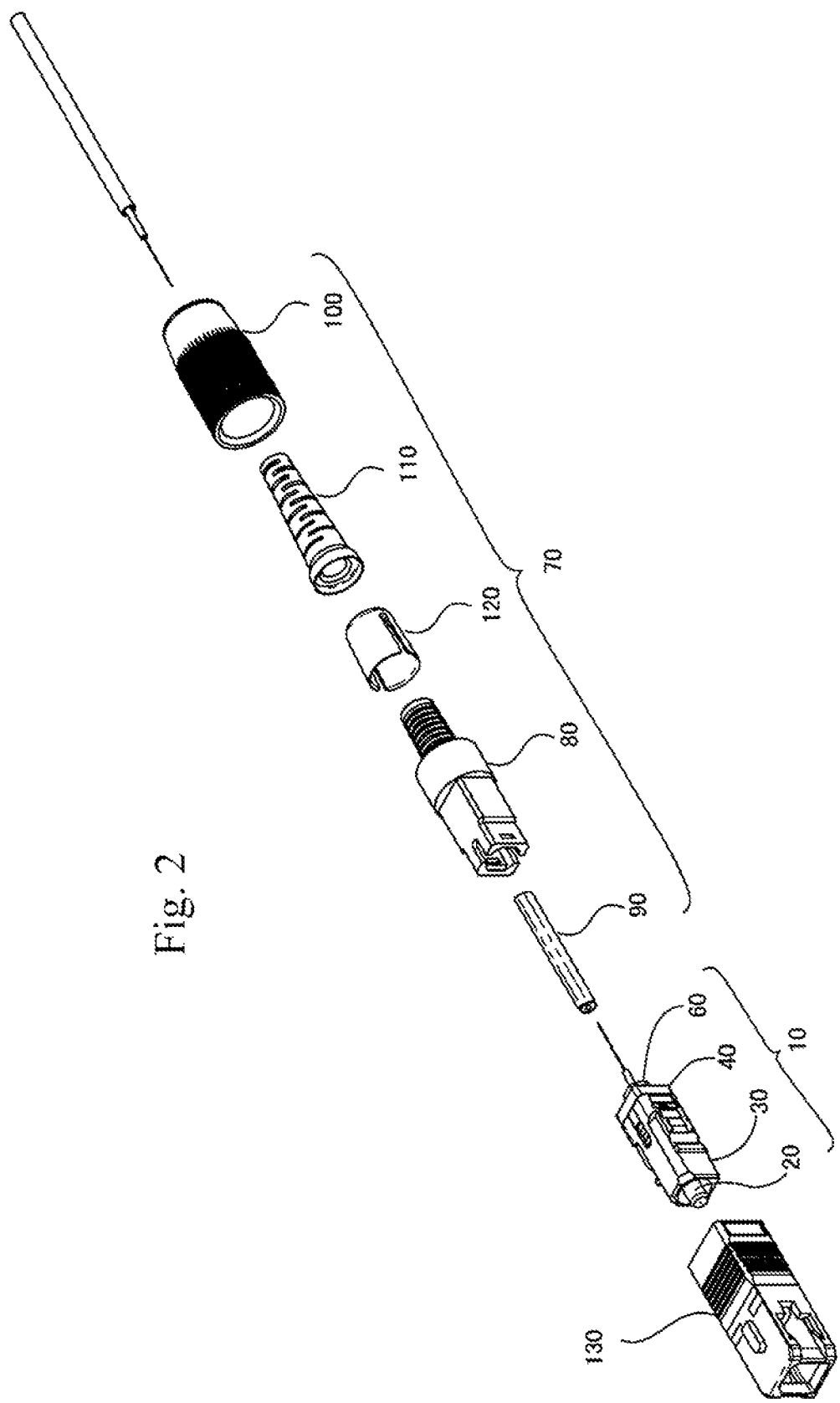
FIG. 2 is a perspective view showing an assembling state of each component.
Figure 3:
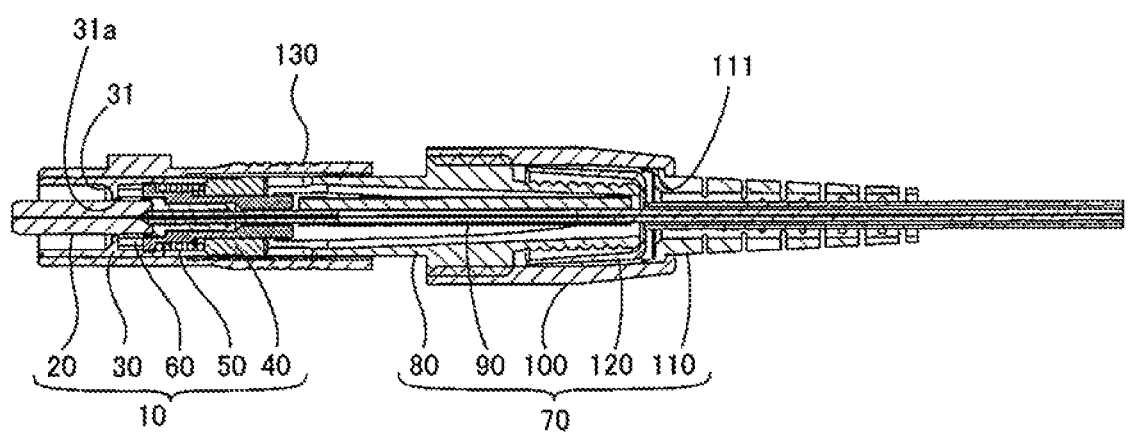
FIG. 3 is a cross-sectional view of the optical connector.

FIG. 1 shows an optical connector concerning one embodiment of the present invention as a perspective view. FIG. 2 shows an assembling state of each component as a perspective view. FIG. 3 shows the optical connector as a cross-sectional view. In each page of FIG. 1 and FIG. 2, a lower left direction is referred to as a front side or a front end side, a upper right direction is referred to as a rear side or a rear end side, an upper side is referred to as an upper side, a lower side is referred to as a lower side, a near side is referred to as a right side, and a back side is referred to as a left side.

In the figures, a first housing portion 10 is formed in a tubular shape to house a ferrule portion 20. The first housing portion 10 has a first housing 30, a first fixing member 40, a spring 50 and a second fixing member 60. A second housing portion 70 has a second housing 80, a fusion protection sleeve 90, an outer jacket fixing member 100, a boot 110 and an outer jacket pressing member 120. In addition, a grip 130 is provided for covering from the first housing portion 10 to the front end of the second housing portion 70. As shown in FIG. 2, the components are inserted and connected to each other in an axial direction of the later described optical fiber. Hereafter, each component will be explained.

Figure 4:
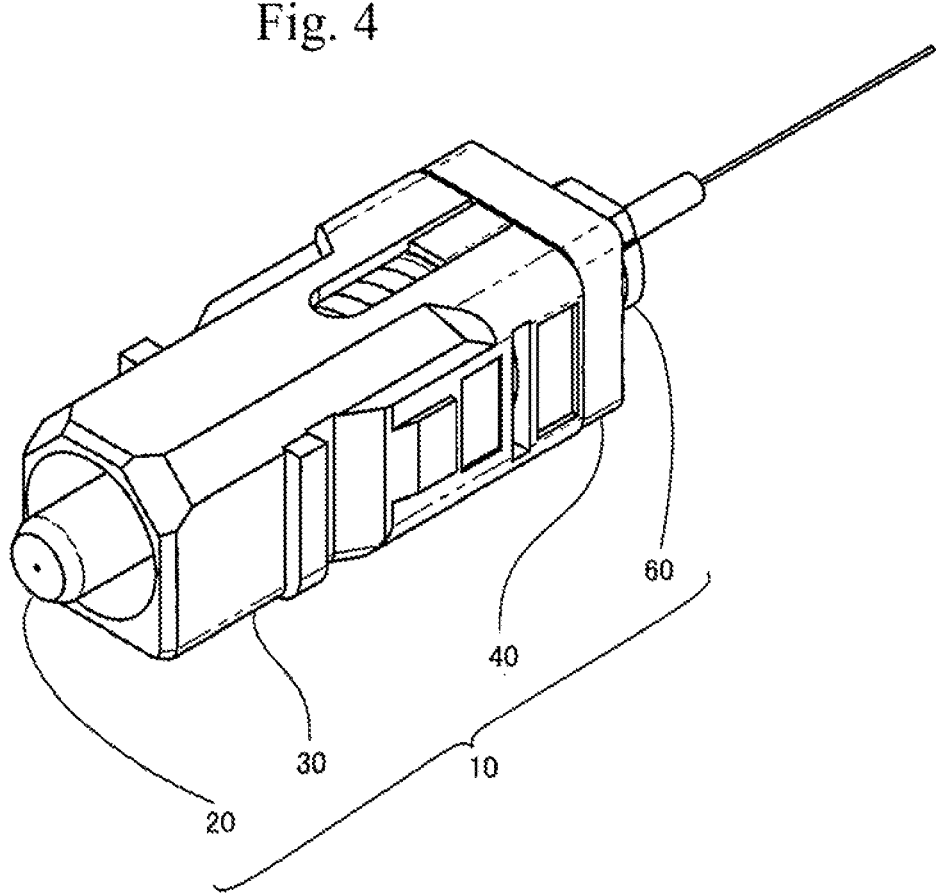
FIG. 4 is a first perspective view of a first housing portion.
Figure 5:
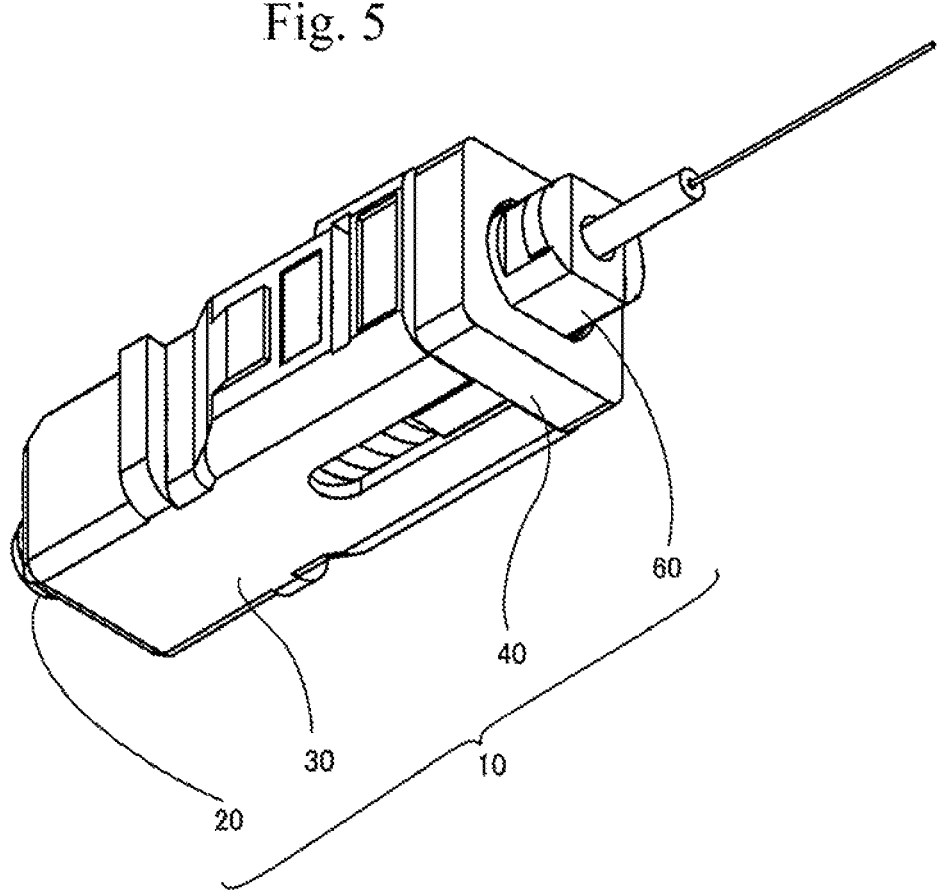
FIG. 5 is a second perspective view of the first housing portion.

FIG. 4 and FIG. 5 show the first housing portion 10 as perspective views from different viewpoints. FIG. 4 shows it as a perspective view looked down from the front, left and upper side. FIG. 5 shows it as a perspective view looked up from the front, right and lower side.

Figure 6:
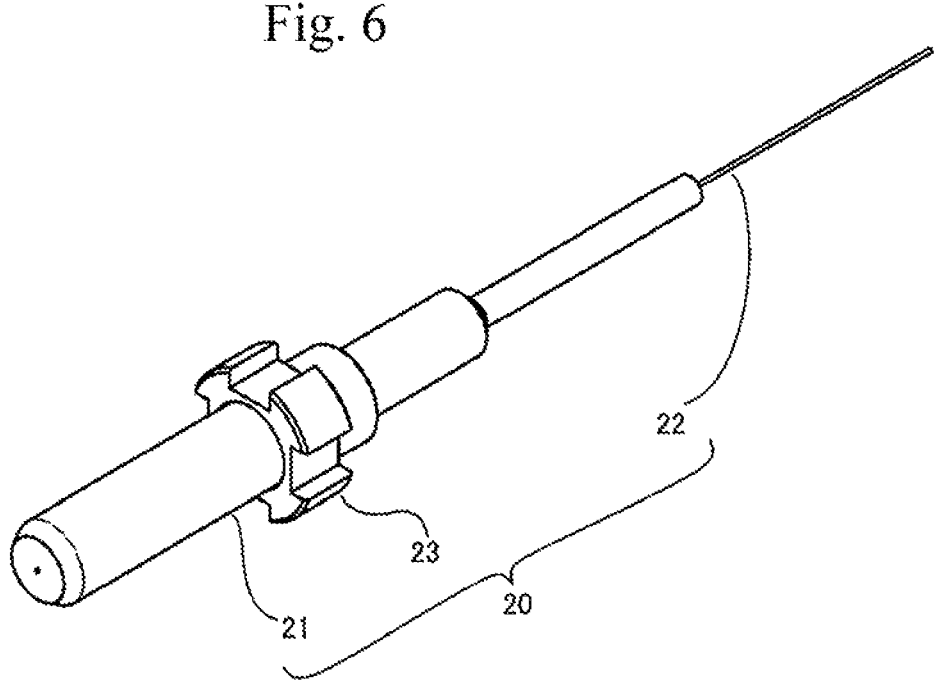
FIG. 6 is a cross-sectional view of a ferrule portion.

FIG. 6 is a cross-sectional view of the ferrule portion.

The ferrule portion 20 holds a built-in fiber 22 by a body portion 21 having a cylindrical shape in a state that the built-in fiber 22 is penetrated through the ferrule portion 20. The built-in fiber 22 is exposed from the rear end of the body portion 21 by a predetermined length. In addition, a flange portion 23 is formed on the body portion 21 at a position having predetermined length from the front end side. The flange portion 23 has a flange shape enlarged in the radial direction.

Figure 7:
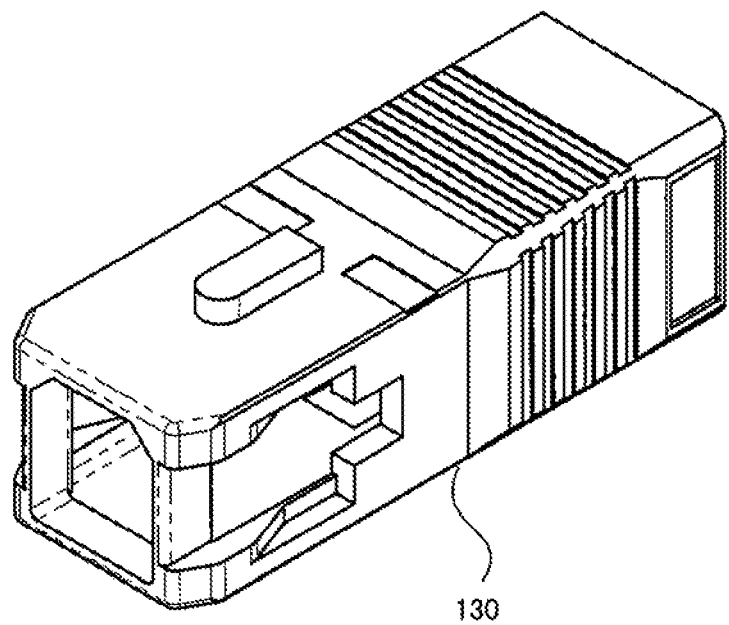
FIG. 7 is a perspective view of a grip.

FIG. 7 is a perspective view of the grip.

In accordance with the shape of the first housing 30 and the front end portion of the second housing 80, which are formed in a rectangular column shape having an approximately rectangular cross-section, the grip 130 is formed in a rectangular column shape to cover from the front end of the first housing 30 to the front end portion of the second housing 80 for hosing them. Consequently, when the front end of the first housing 30 to the front end portion of the second housing 80 is inserted into the grip 130, the angle between the first housing 30 and the second housing 80 is maintained (not changed) after they are inserted into the grip 130. Thus, the first housing 30 and the second housing 80 cannot to be freely rotated with respect to each other.

The later described tubular engagement portion 66 and engagement receiving portion 86 are formed respectively on the first housing 30 and the second housing 80. The grip 130 is attached to cover the outer periphery to prevent the tubular engagement portion 66 and the engagement receiving portion 86 from being rotated with respect to each other in a state that they are fitted to each other.

Figure 8:
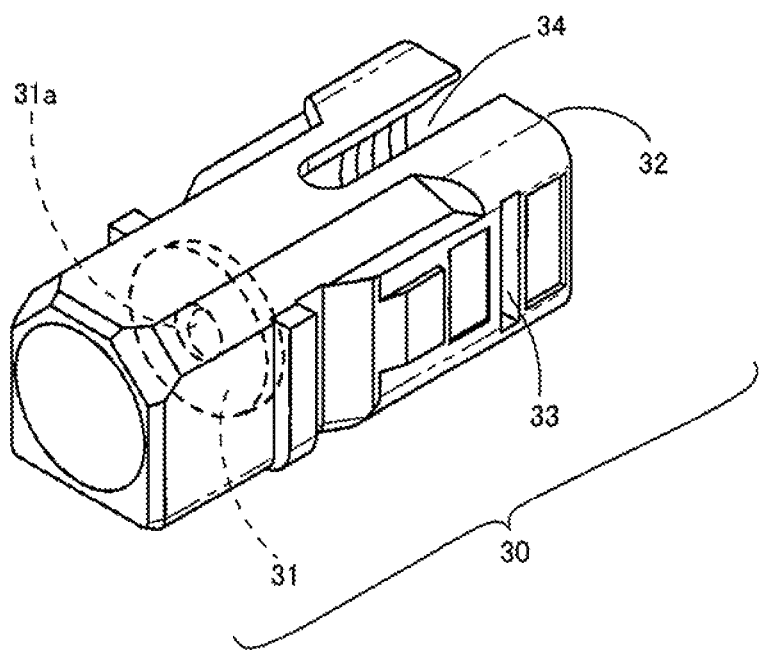
FIG. 8 is a perspective view of a first housing.
Figure 9:
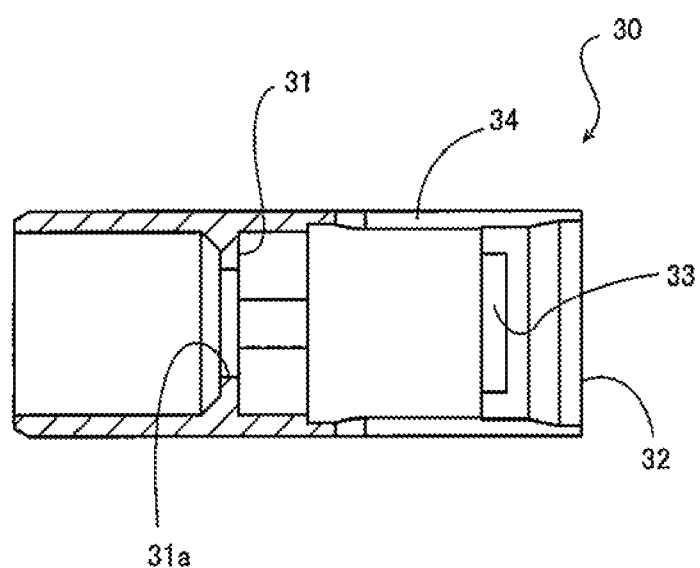
FIG. 9 is a cross-sectional view of the first housing.

FIG. 8 shows the first housing as a perspective view and FIG. 9 shows it as a cross-sectional view.

The first housing 30 is formed in an approximately rectangular column shape. A partition wall 31 is formed inside the first housing 30. When the ferrule portion 20 is inserted into the first housing 30 from the rear side, the cylindrical body portion 21 of the ferrule portion 20 penetrates through a through hole 31a formed on the partition wall 31, while the flange portion 23 abuts on the partition wall 31. The abutting position corresponds to the front end position of the flange portion 23. In this state, the front end of the ferrule portion 20 is protruded from the front end of the first housing 30 by a predetermined length.

The ferrule portion 20, the first fixing member 40, the spring 50 and the second fixing member 60 are inserted into the first housing 30 from the rear side of the first housing 30 in this order. Hereafter, each component will be explained.

The second fixing member 60, the spring 50 and the first fixing member 40 are attached from the rear side of the ferrule portion 20.

Figure 10:
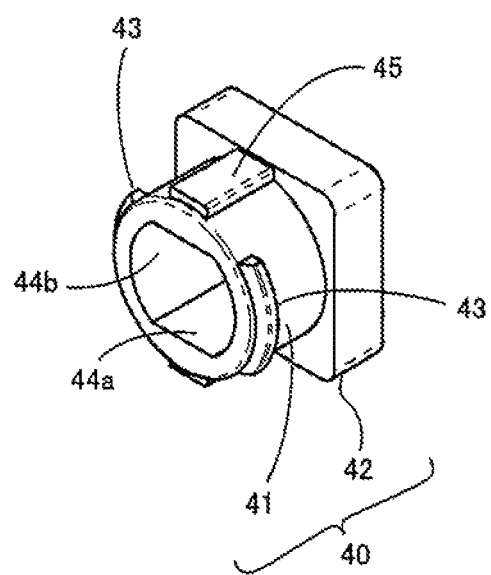
FIG. 10 is a perspective view of a first fixing member.
Figure 11:
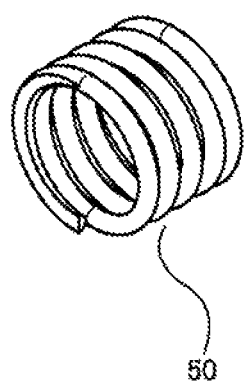
FIG. 11 is a perspective view of a spring.
Figure 12:
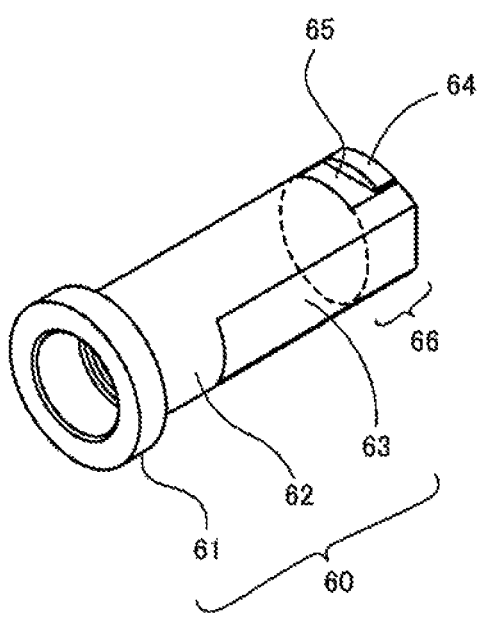
FIG. 12 is a perspective view of a second fixing member.

FIG. 10 is a perspective view of the first fixing member. FIG. 11 is a perspective view of the spring. FIG. 12 is a perspective view of the second fixing member.

The first fixing member 40 is formed from a tubular portion 41 and a lid portion 42 arranged on the rear side of the tubular portion 41. The first fixing member 40 is attached to an opening 32 located on the rear end of the first housing 30. Protrusions 43 are formed on an outer peripheral surface of the tubular portion 41, which is inserted into the first housing 30. On the other hand, an opening 33 is formed on a peripheral wall surface of the rear end side of the first housing 30 at a position facing the protrusions 43. Consequently, when the first fixing member 40 is inserted from the rear side of the first housing 30, the tubular portion 41 enters in the first housing 30. At that time, the peripheral wall of the rear end side of the first housing 30 is pushed and extended to the outside by the protruded amount of the protrusions 43. Since the first housing 30 is pushed and extended to the outside as described above, a notch portion 34 is formed on an upper wall surface and a lower wall surface of the peripheral wall of the rear end side of the first housing 30 over a predetermined length from the rear end toward the front side.

When the first fixing member 40 is inserted until the position where the lid portion 42 abuts on the edge of the opening 32 of the first housing 30, the protrusions 43 and the opening 33 are faced with each other and fitted to each other. At that time, the protruded portion of the protrusions 43 is housed in the opening 33. Thus, the peripheral wall of the rear end side of the first housing 30 returns to its original shape from the extended state. Since a convex portion 45 capable of being inserted into the notch portion 34 is formed on the outer peripheral surface of the tubular portion 41 of the first fixing member 40 at a position corresponding to the notch portion 34 of the first housing, positioning function can be provided when the notch portion 34 and the convex portion 45 are fitted to each other by recess-projection fitting.

The first fixing member 40 is fitted to the first housing 30 as explained above. Before that, the spring 50 and the first fixing member 40 are inserted into the second fixing member 60. The second fixing member 60 has a flange-shaped portion 61 located at the front end and a body portion 62 having a tubular shape. The body portion 62 is formed in a tubular shape capable of inserting the spring 50 around it. The spring 50 has an outer diameter approximately same as an outer diameter of the flange-shaped portion 61 located at the front end of the second fixing member 60 and an outer diameter of the tubular portion 41 of the first fixing member. In addition, the body portion 62 of the second fixing member 60 has a size capable of being inserted into the tubular portion 41 of the first fixing member 40. Therefore, when the body portion 62 of the second fixing member 60 is inserted into the spring 50 and further inserted into the tubular portion 41 of the first fixing member 40, the spring 50 is supported in a state of being sandwiched between the flange-shaped portion 61 and the tubular portion 41.

Before the first fixing member 40 is inserted from the opening 32 of the first housing 30 in a state that the first fixing member 40 and the spring 50 are inserted around the second fixing member 60, the preliminarily inserted built-in fiber 22 of the ferrule portion 20 is inserted into the body portion 62 of the second fixing member 60. By doing so, the body portion 21 of the ferrule portion 20 is also inserted into the body portion 62 of the second fixing member 60, but the front end of the body portion 62 abuts on the flange portion 23. The second fixing member 60 is elastically supported by the first fixing member 40 via the spring 50. The ferrule portion 20 is also supported by the first fixing member 40 via the spring 50 although the second fixing member 60 abuts on the ferrule portion 20 at the front side. Consequently, the ferrule portion 20 abuts on the partition wall 31 at the front end position in the first housing 30 and cannot be further moved to the front side. On the other hand, as for the rear side, the ferrule portion 20 is elastically supported by an elastic force of the spring 50 over the length that the spring 50 can be contracted.

Figure 13:
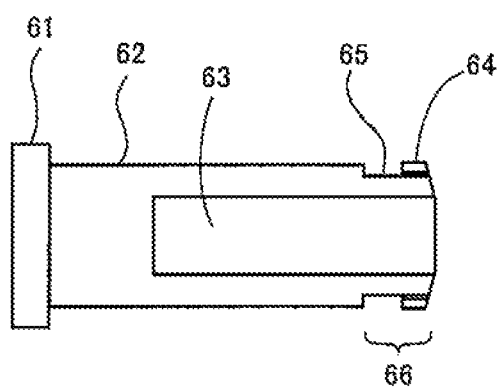
FIG. 13 is a plan view of the second fixing member.

FIG. 13 is a plan view of the second fixing member.

The body portion 62 of the second fixing member 60 has an approximately cylindrical shape, and the peripheral surface of the body portion 62 is cut at a predetermined position. First, a flat surface portion 63 is formed by vertically notching the upper and lower peripheral surfaces only over a predetermined length from the rear end side to the front side. Namely, the cross-sectional shape of the portion on which the flat surface portion 63 is formed has an approximately rectangular shape. Of course, the portion on which the flat surface portion 63 is not formed has a curved surface of the original cylindrical shape.

Corresponding to the rear end side of the second fixing member 60 which is the portion on which the flat surface portion 63 is formed, an inner peripheral surface of the tubular portion 41 of the first fixing member 40 has a vertical wall surface 44a facing the flat surface portion 63 and a cylindrical surface 44b facing the curved surface of the cylindrical shape. Since the above described cross-sectional shape is formed, the body portion 62 of the second fixing member 60 can be inserted into the tubular portion 41 of the first fixing member 40 only within the length on which the flat surface portion 63 is formed. In addition, the angle between the first fixing member 40 and the second fixing member 60 is fixed in the inserted state.

A predetermined range of the rear end side of the second fixing member 60 corresponds to the tubular engagement portion 66. The tubular engagement portion 66 will be explained below.

Near the rear end of the body portion 62 of the second fixing member 60, cutting portions 65 are formed by cutting left and right walls in addition to the flat surface portion 63 of the upper and lower walls so as to leave protrusions 64 at the rear end. In other words, the near side (front side) of the protrusions 64 is cut in a planar shape along the peripheral surface direction only over a predetermined distance. The outer peripheral surface of the protrusions 64 has an approximately same outer diameter as that of the body portion 62. However, since the cutting portions 65 are formed on the near side (front side) of the protrusions 64, protrusions 64 can be said to be protruded in comparison with the cutting portions 65. Both the protrusions 64 and the cutting portions 65 formed on the rear end side of the second fixing member 60 correspond to the tubular engagement portion 66. The second fixing member 60 penetrates through the first fixing member 40 to a degree that at least the cutting portions 65 and the protrusions 64 penetrate through the first fixing member 40 and project toward the rear side. Furthermore, since the flat surface portion 63 has a margin, the second fixing member 60 can be slightly moved to the rear side. The length of the above described movement corresponds to the length that the ferrule portion 20 can be moved to the rear side in a state of being elastically supported.

Figure 14:
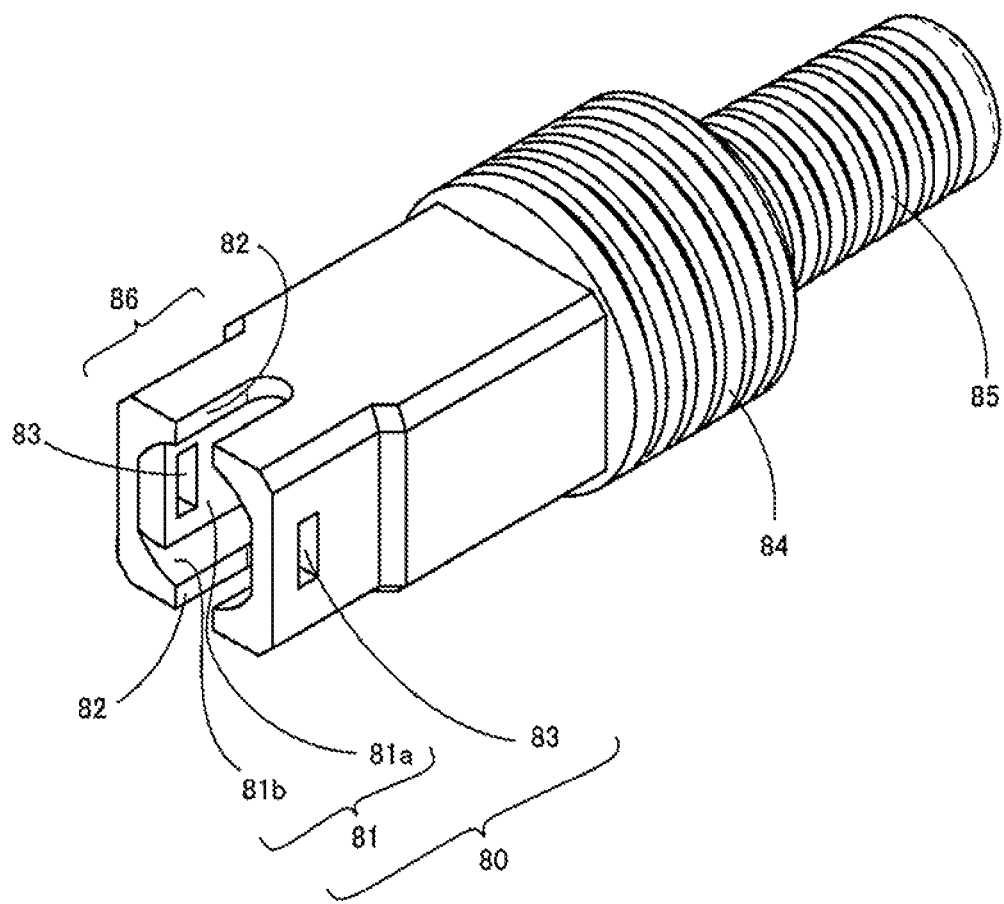
FIG. 14 is a perspective view of a second housing.
Figure 15:
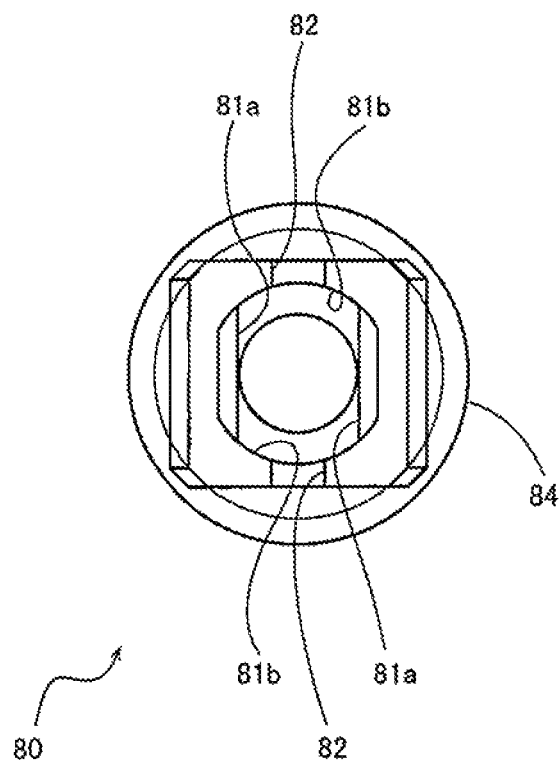
FIG. 15 is a front view of the second housing.

FIG. 14 is a perspective view of a second housing. FIG. 15 is a front view of the second housing.

The front end side of the second housing 80 is formed in an approximately rectangular cylindrical shape having a rectangular cross-section. The rear end side of the second housing 80 is formed in an approximately circular cylindrical shape having a circular cross-section. The second housing 80 is formed in a tubular shape for housing the fiber connection portion which connects the built-in fiber 22 of the ferrule portion 20 with the optical fiber exposed by removing the outer jacket.

Although an opening 81 formed on the front end of the second housing 80 has an approximately circular shape, the opening 81 has a cross-sectional shape corresponding to the outer shape of the second fixing member 60 projected from the first fixing member 40. Since the tubular engagement portion 66 of the second fixing member 60 is inserted into the opening 81 of the second housing 80, the opening 81 corresponds to the engagement receiving portion 86. After the tubular engagement portion 66 is inserted into the engagement receiving portion 86, they are rotated relatively to each other by 90° to fit them to each other. Therefore, an inner peripheral surface and other portions of the engagement receiving portion 86 are formed as follows.

Same as the tubular portion 41 of the first fixing member 40, the inner peripheral surface of the engagement receiving portion 86 has a vertical wall surface 81a facing the flat surface portion 63 and a cylindrical surface 81b facing the curved surface of the cylindrical shape. In addition, a notch portion 82 is formed by notching the upper wall surface and the lower wall surface over a predetermined length from the open end.

The engagement receiving portion 86 has a cylindrical shape in a slightly short length from the open end. The rear side (back side) of the cylindrical-shaped portion is referred to as the vertical wall surface 81a and the cylindrical surface 81b. The length of the cylindrical shaped portion is slightly shorter than the length of the cutting portion 65 of the tubular engagement portion 66. When the first housing 30 is assembled, the tubular engagement portion 66 of the body portion 62 of the second fixing member 60 is projected from the fixing member 40. The cutting portions 65 and the protrusions 64 of the tubular engagement portion 66 are projected from the first fixing member 40, and these portions are inserted into the engagement receiving portion 86. The vertical wall surface 81a is formed on the back side of the cylindrical shaped portion of the open end, and a recessed engagement portion 83 is formed at the position shifted to the rear side by only a length of the cutting portion 65 so that the recessed engagement portion 83 faces the protrusions 64. Accordingly, the protrusions 64 are inserted to the position where the recessed engagement portion 83 is formed. When the protrusions 64 are inserted into the engagement receiving portion 86, the protrusions 64 pass thorough the portion having the cylindrical surface. In other words, the portion having the cylindrical surface is the cylindrical portion of the opening and the cylindrical surface 81b continuing from the cylindrical portion of the opening. In the cylindrical surface 81b, the portion thorough which the protrusions 64 pass corresponds to the protrusion-avoiding portion.

When the second housing 80 and the first housing 30 are approached to each other along the axial direction after the built-in fiber 22 and the optical fiber are connected to each other as described later, the body portion 62 of the second fixing member 60 begins to enter into the opening 81 of the second housing 80. Namely, the tubular engagement portion 66 begins to enter into the engagement receiving portion 86. Since the vertical wall surface 81a and the cylindrical surface 81b are formed on the opening 81 so as to approximately match the outer shape of the rear end of the body portion 62, the second housing 80 can be inserted until it abuts on the first fixing member 40 which closes the opening of the first housing 30 while keeping the relative angle between the first fixing member 40 and the first housing 30.

The protrusions 64 of the body portion 62 of the second fixing member 60 have approximately same height as the cylindrical surface of the body portion 62. In addition, the cylindrical surface 81b of the second housing 80 also has approximately same size as the cylindrical surface of the body portion 62. Thus, the protrusions 64 can be inserted without interfering with the second housing 80.

Then, the second housing 80 is rotated by 90° with respect to the first housing 30. Consequently, the protrusions 64 facing the cylindrical surface 81b are rotated to face the vertical wall surface 81a. Thus, the vertical wall surface 81a receives the force for expanding it to the outside by the protruded amount of the protrusions 64. The expanded area is absorbed by expanding the notch portion 82. Accordingly, the second housing 80 can be rotated by 90° with respect to the first housing 30 without generating a great resistance force. When the second housing 80 is rotated by 90° with respect to the first housing 30, the protrusions 64 face the recessed engagement portion 83 formed on the vertical wall surface 81a and enter into the recessed engagement portion 83, and the expanded second housing 80 returns to its original shape. Consequently, the protrusions 64 and the recessed engagement portion 83 are tightly fitted to each other. As explained above, the first housing 30 and the second housing 80 are fitted to each other by inserting one of them into the other while aligning in the axial direction and rotating one of them with respect to the other by the angle smaller than one rotation.

In the present embodiment, the first housing portion 10 is formed by the first housing 30, the first fixing member 40, the spring 50 and the second fixing member 60. The first fixing member 40, the spring 50 and the second fixing member 60 are housed in the first housing 30. The second housing portion 70 is formed by the second housing 80, the outer jacket fixing member 100, the boot 110 and the outer jacket pressing member 120. The outer jacket fixing member 100, the boot 110 and the outer jacket pressing member 120 will be described later. The second housing portion 70 is arranged on the rear side of the first housing portion 10. The fitting portion between them is substantially the protruded portion of the body portion 62 of the second fixing member 60 and the portion of housing the protruded portion near the opening of the second housing 80.

The protruded portion of the body portion 62 of the second fixing member 60 corresponds to the tubular engagement portion 66 which is formed in an approximately cylindrical shape protruded toward the other in the axial direction for inserting the built-in fiber into the tubular engagement portion 66, where the protrusions 64 protruding to the axial direction are formed on the outer peripheral surface of the tubular engagement portion 66. In addition, the portion of housing the protruded portion near the opening of the second housing 80 corresponds to the engagement receiving portion 86 which can house the tubular engagement portion 66, has the axially aligned cylindrical surface 81*b* (protrusion-avoiding portion) into which the protrusions 64 can be inserted without causing interference, and has the recessed engagement portion 83 formed on the inner peripheral surface of the engagement receiving portion 86 (vertical wall surface 81*a*) at a part other than the cylindrical surface 81*b* and arranged at a position capable of facing the protrusions 64 so that the recessed engagement portion 83 and the protrusions 64 are fitted to each other. The engagement structure is formed by the above described pair of shapes. Any of the above described components can be formed on the first housing portion 10, although any of them can be also formed on the second housing portion 70.

In the present embodiment, two protrusions 64 are formed on the predetermined positions of the upper surface and the lower surface of the body portion 62, and two cylindrical surface 81*b* and two recessed engagement portions 83 are formed on the predetermined positions corresponding to the protrusions 64. However, it is enough if they can be fitted to each other by inserting and rotating one of them with respect to the other by the angle smaller than one rotation. Thus, it is possible to form three or more pairs of them are formed on the predetermined positions. As explained above, a plurality of protrusions 64 can be formed on the peripheral surface of the tubular engagement portion 66, and a plurality of cylindrical surface 81*b* and a plurality of recessed engagement portion 83 can be formed on the engagement receiving portion 86 corresponding to the plurality of protrusions.

In the inner peripheral surface of the engagement receiving portion 86, the vertical wall surface 81*a*, which is capable of housing the cutting portion 65 and is a part where the protrusions 64 of the tubular engagement portion 66 are not formed, corresponds to the small-diameter portion, the cylindrical surface 81*b*, which has a diameter corresponding to the height of the protrusion 64 and has same outer shape as the body portion 62, corresponds to the large-diameter portion, and the recessed engagement portion 83 is formed on the small-diameter portion.

As explained above, the grip 130 corresponds to the fact that the first housing 30 and the front end portion of the second housing 80 are formed in a rectangular column shape having an approximately rectangular cross-section, and the grip 130 is attached to cover them. The grip 130 is attached after the second housing 80 is inserted to the first housing 30 and rotated by 90° to fit them to each other. When the grip 130 is attached, the first housing 30 and the second housing 80 are not freely rotated with respect to each other. Thus, it is possible to prevent the fitting from loosening. In addition, the notch portions 34, 82 are formed so that the first housing 30 and the second housing 80 are expanded by the protruded amount of the protrusions 43 and the protrusions 64 when the first fixing member 40 is fitted to the first housing 30 and when the second housing 80 is rotated by 90° with respect to the first housing 30. When the notch portions 34, 82 are formed, the assembling work becomes easy because the components are easily expanded. On the other hand, when strong force is applied, the components are expanded and easily detached. However, when the grip 130 is attached to press the components from the outside as shown in the present embodiment to prevent the notch portions 34, 82 from being expanded, the notch portions 34, 82 cannot be expanded even if the strong force is applied. Thus, it acts to improve the bearing force against the tension.

As explained above, the ferrule portion 20 is housed in the first housing 30 to be movable within a predetermined range which is the distance that the spring 50 can be contracted. In addition, the front end of the second fixing member 60 (tubular engagement portion 66) abuts on the flange portion 23 of the ferrule portion 20 and the ferrule portion 20 is energized frontward by the spring 50.

In other words, the second fixing member 60 (tubular engagement portion 66) is protruded from the inside of the first housing portion 10 to the outside, housed in the first housing portion 10 to be movable within a predetermined range, and energized frontward by the spring 50 (elastic member) in the first housing 30 of the first housing portion 10.

The structure and operation of fitting the first housing portion 10 and the second housing portion 70 to each other are described above. Next, the assembling process of connecting the optical fiber of the optical cable with the built-in fiber 22 of the ferrule portion 20 to form the optical connector will be explained.

Figure 16:
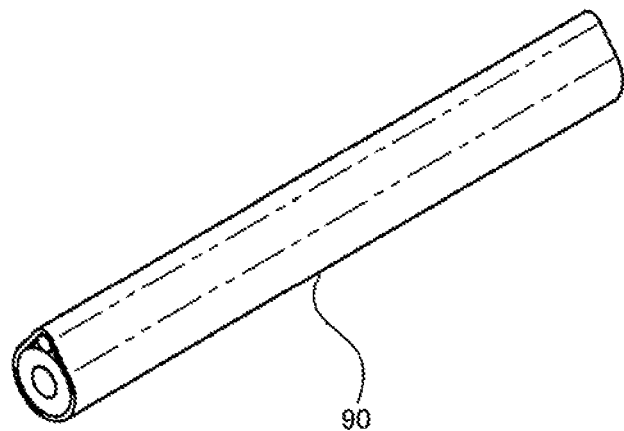
FIG. 16 is a perspective view of a fusion protection sleeve.
Figure 17:
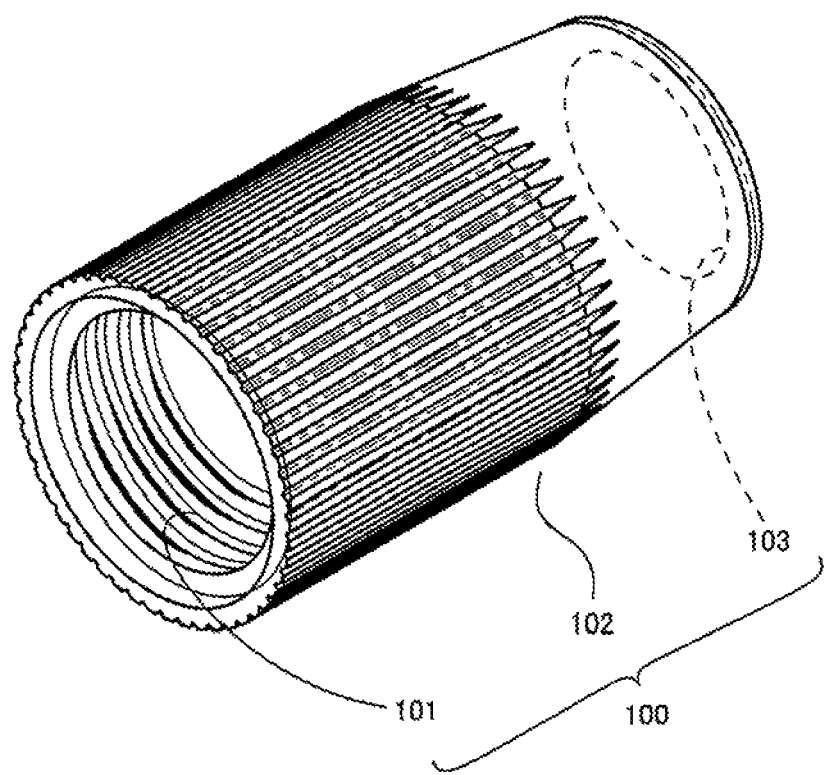
FIG. 17 is a perspective view of an outer jacket fixing member.
Figure 18:
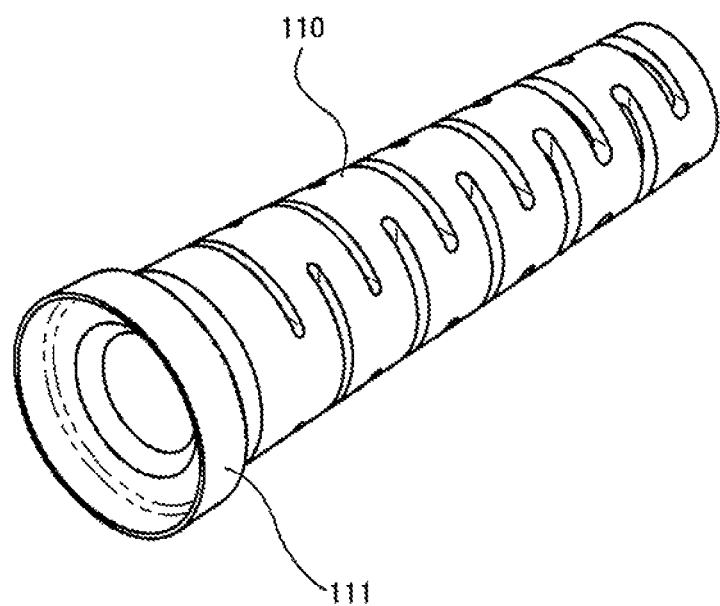
FIG. 18 is a perspective view of a boot.
Figure 19:
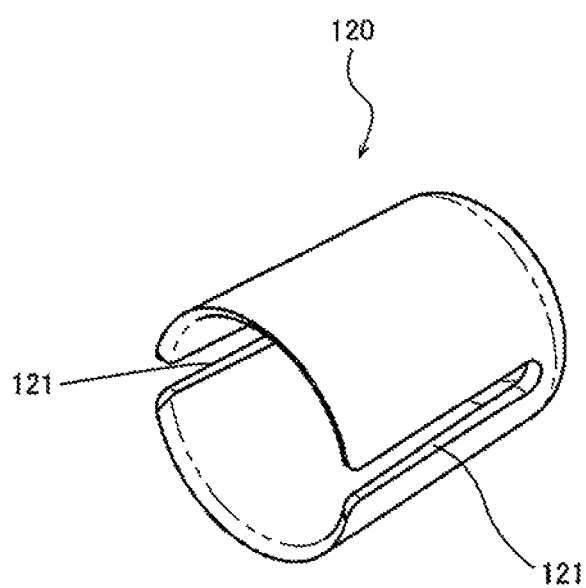
FIG. 19 is a perspective view of the outer jacket pressing member.

FIG. 16 is a perspective view of the fusion protection sleeve. FIG. 17 is a perspective view of the outer jacket fixing member. FIG. 18 is a perspective view of the boot. FIG. 19 is a perspective view of the outer jacket pressing member.

The second housing portion 70 has the second housing 80, the fusion protection sleeve 90, the outer jacket fixing member 100, the boot 110 and the outer jacket pressing member 120.

The outer jacket fixing member 100 is formed in an approximately cylindrical shape so that the rear end portion of the second housing 80 can be housed in the outer jacket fixing member 100. A female thread 101 is formed on an inner peripheral surface of the front end side of the outer jacket fixing member 100 so that the female thread 101 can be screwed with a male thread 84 formed on an outer peripheral surface of the rear end portion of the second housing 80. An opening 103 formed on the rear end side of the outer jacket fixing member 100 has a diameter slightly smaller than that of a body portion 102. This is because the opening 103 should be smaller in diameter than a flange portion 111 formed on the front end side of the boot 110. When the boot 110 is inserted from the opening located at the front end side of the outer jacket fixing member 100, the flange portion 111 of the boot 110 abuts on the edge of the opening 103. Thus, the outer jacket fixing member 100 and the boot 110 are integrated with each other.

Figure 20:
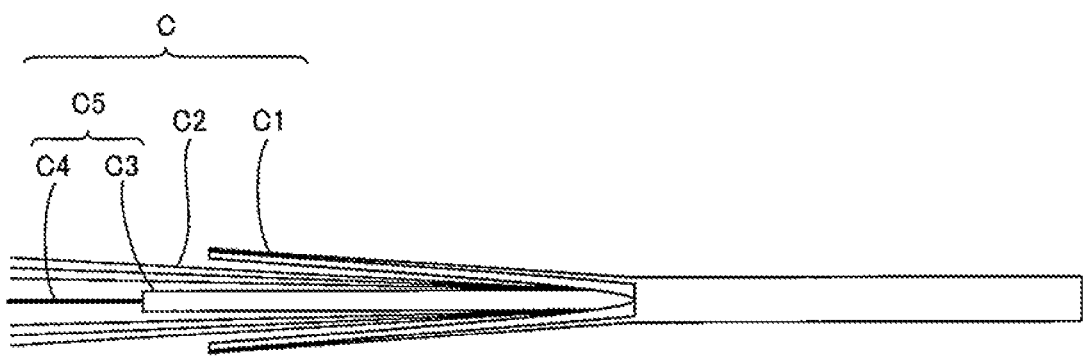
FIG. 20 is a plan view of the front end of an optical cable.

FIG. 20 shows the front end of the optical cable.

An optical cable C is formed by covering an optical fiber core wire with the outer jacket. As the structure of the optical cable C, a circumference of an optical fiber core wire C5 including an optical fiber C4 is covered by tensile strength fibers C2 and an outer jacket C1.

The optical cable is inserted through the outer jacket fixing member 100 and the boot 110 from the rear end, and further inserted through a cup-shaped outer jacket pressing member 120 and the second housing 80. As shown in FIG. 20, the outer jacket C1 is cut over a predetermined length from the front end side of the optical cable C. Consequently, the tensile strength fibers C2 are exposed from the outer jacket C1. The optical fiber core wire C5 is exposed by further tearing the tensile strength fibers C2. As for the optical fiber core wire C5, a circumference of the optical fiber C4 is covered by a protection member C3. The optical fiber 4 is exposed by removing the protection member C3. The optical fiber C4 is inserted through the fusion protection sleeve 90. After passing through the fusion protection sleeve 90, the front end of the optical fiber C4 is fused and fixed to the rear end of the built-in fiber 22 projected from the ferrule portion 20 by using a predetermined tool. Then, the fusion protection sleeve 90 is moved forward to protect the fused and fixed portion.

Then, the second housing 80 is moved forward to be fitted to the second fixing member 60. In this state, the outer jacket of the optical cable covers a taper-shaped tubular portion 85 arranged at the rear end of the second housing 80. Therefore, when the cup-shaped outer jacket pressing member 120 is moved forward, the outer jacket C1 and the tensile strength fibers C2 of the optical cable are sandwiched between the outer jacket pressing member 120 and the tubular portion 85. When the outer jacket fixing member 100 is moved forward and the female thread 101 of the outer jacket fixing member 100 is screwed with the male thread 84 of the second housing 80, the outer jacket pressing member 120 is gradually moved forward. However, since the outer peripheral surface of the tubular portion 85 is formed in a tapered-shape having a diameter increasing gradually to the front end, the tubular portion 85 strongly presses the outer jacket and the tensile strength fibers which are sandwiched by the tubular portion 85 and the outer jacket pressing member 120. Thus, the outer jacket and the tensile strength fibers are tightly fixed to each other. In addition, recesses and protrusions are alternately and consecutively formed along the outer peripheral surface of the tubular portion 85. Accordingly, the portions having larger clearance and the portion having smaller clearance are consecutively formed between the tubular portion 85 and the outer jacket fixing member 100. By interposing the outer jacket or the tensile strength fibers in the clearance, the outer jacket and the tensile strength fibers are partly strongly compressed and weekly compressed depending on the portions. Consequently, the outer jacket or the tensile strength fibers can be hardly removed. In addition, the outer jacket pressing member 120 has a peripheral wall surface having a tapered-shape where the opening becomes larger from the rear end side to the front end side, and two notches 121 are formed on the peripheral wall surface directed from the front end side to the rear end side. Thus, the opening of the front end side is easily expanded. In a state that the outer jacket is open and the tensile strength fibers are exposed, the cup-shaped outer jacket pressing member 120 is moved forward to evenly expand the tensile strength fibers around the tubular portion 85 and press the tensile strength fibers. At that time, since the open end side is more easily expanded, the expanded tensile strength fibers can be effectively pressed by the outer jacket pressing member 120.

As explained above, the outer jacket pressing member 120 presses the outer jacket of the optical cable to the tubular portion 85 arranged at the rear end of the second housing 80, and the outer jacket fixing member 100 is fixed by being screwed into the second housing 80 to house the outer jacket pressing member 120 so that tensile strength fibers included in the optical cable are fixed to the rear end of the second housing 80 together with the outer jacket. At that time, the tensile strength fibers, which are arranged to cover the male thread 84, are sandwiched by the male thread 84 and the female thread 101. Consequently, the optical cable is firmly fixed to the second housing 80. Thus, the tensile strength can be increased. In the present embodiment, the optical connector is realized for fixing the optical cable to the second housing 80. However, in addition to the optical cable, the optical connector can be widely applied for connecting a housing of the optical fiber with the ferrule portion.

As explained above, after the optical cable is fixed to the rear end of the second housing 80, the first housing portion 10 including the grip 130 is inserted into the not illustrated adapter side and the optical cable is pulled in a state that the adapter side and the first housing portion 10 are fitted to each other. In the conventional optical connector, the first housing portion 10 and the second housing portion 70 are integrally fitted to each other, and therefore entire load is supported by the fitting portion between the first housing portion 10 and the adapter when pulled from the optical connector side. In other cases, entire load is supported by the fitting portion between the first housing portion 10 and the second housing portion 70.

The same happens when the tension is momentarily applied only for a short time.

However, in the above described embodiment of the present invention, since the optical cable is fixed to the rear end of the second housing 80, entire load is applied to the second housing 80 when the optical cable is pulled. The front end of the second housing 80 is fitted to the second fixing member 60 which is elastically supported in the first housing 30 via the spring 50, and the front end is supported by the second fixing member 60 in a slightly movable state. Therefore, the tension is also supported by the spring 50 when the optical cable is pulled. Since the elastic member such as the spring 50 is interposed, even when large tension is momentarily applied, the momentarily applied tension is absorbed by the elastic member and then supported by the fitting portion between the first housing portion 10 and the adapter after a little while. Consequently, the ability to withstand the tension becomes larger as a whole.

In addition, although the tension presses the peripheral wall outward so as to release each fitting portion, the peripheral walls are not extended outward since the grip 130 covers the pressed portions from the outside. Thus, the fitting portions are not released. Although the above described ability to withstand the tension is equipped, since the grip 130 is not attached in an assembling process, the peripheral walls can be relatively easily expanded outside by the protruded amount of the protrusions 43 and the protrusions 64. Thus, the assembling work is easy.

In the above described embodiment, the optical cable in which the optical fiber core wire is covered by the outer jacket and the tensile strength fibers is connected. However, some of optical cables have a small diameter without having the outer jacket and the tensile strength fibers.

FIG. 21 to FIG. 24 show the optical connector to connect the optical cable with such a small diameter.

Figure 21:
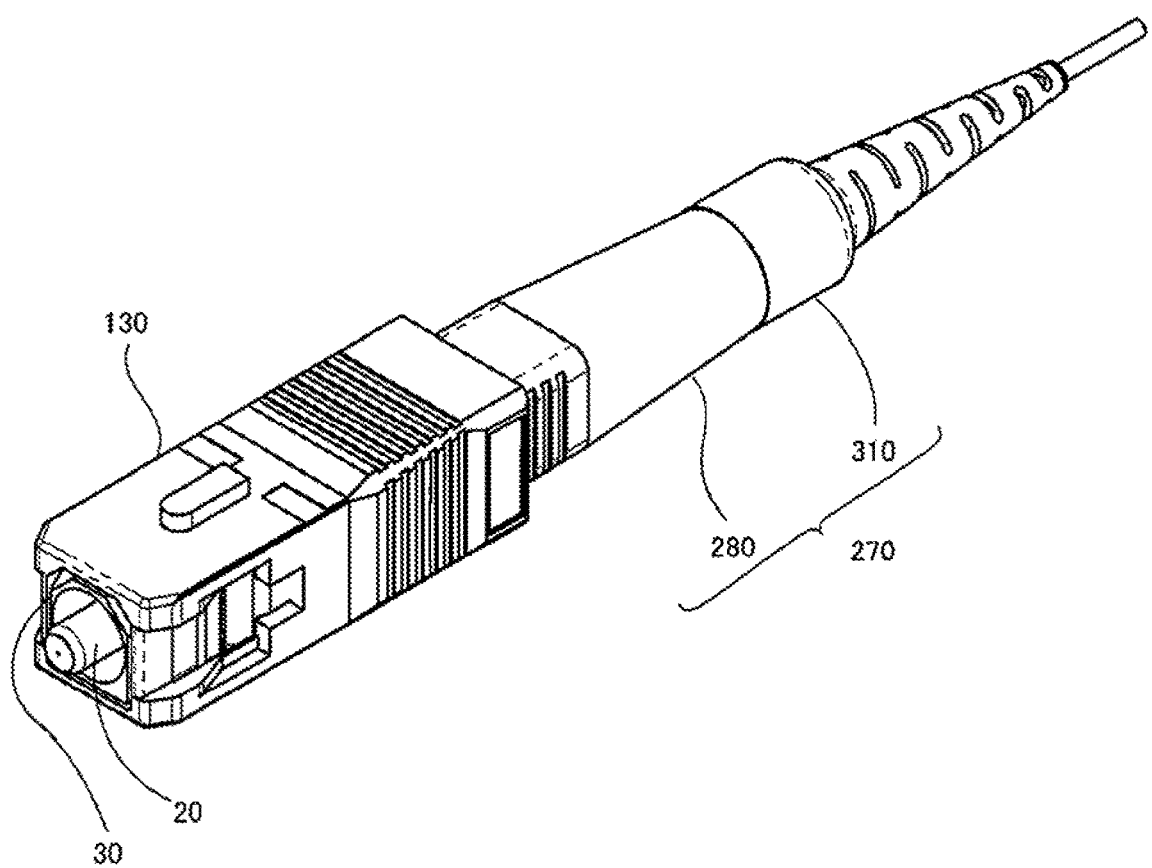
FIG. 21 is a perspective view of the optical connector.
Figure 22:
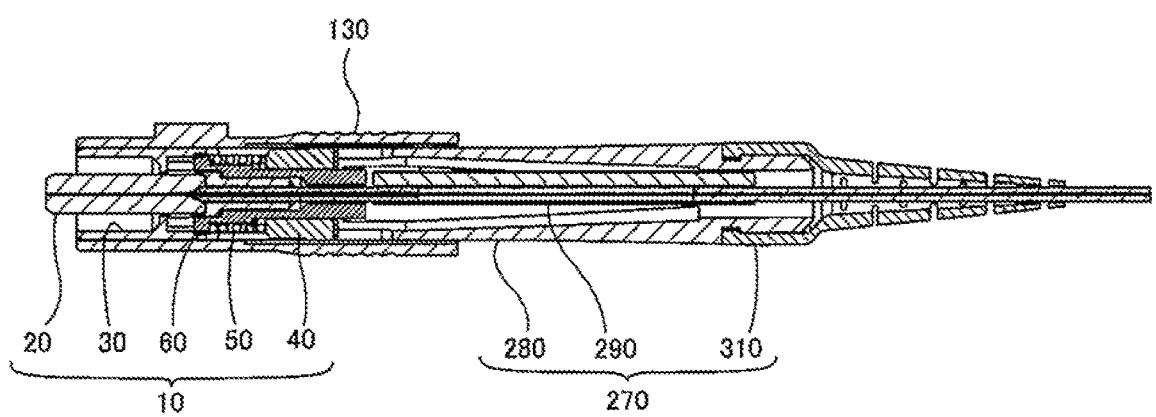
FIG. 22 is a cross-sectional view of the optical connector.

FIG. 21 shows an outer appearance of the optical connector by a perspective view. FIG. 22 shows it by a cross-sectional view.

In the drawings, the first housing portion 10 is formed in a tubular shape to house the ferrule portion 20. The first housing portion 10 has a first housing 30, a first fixing member 40, a spring 50 and a second fixing member 60. A second housing portion 270 has a second housing 280, a fusion protection sleeve 290 and a boot 310. In addition, a grip 130 is provided to cover from the first housing portion 10 to the front end of the second housing portion 270.

When comparing the present embodiment with the previous embodiment, the second housing portion 270 corresponds to the second housing portion 70, the second housing 280 corresponds to the second housing 80, the fusion protection sleeve 290 corresponds to the fusion protection sleeve 90, and the boot 310 corresponds to the boot 110.

Since the optical cable does not have the outer jacket and the tensile strength fibers, the components corresponding to the outer jacket fixing member 100 and the outer jacket pressing member 120 are not provided.

Figure 23:
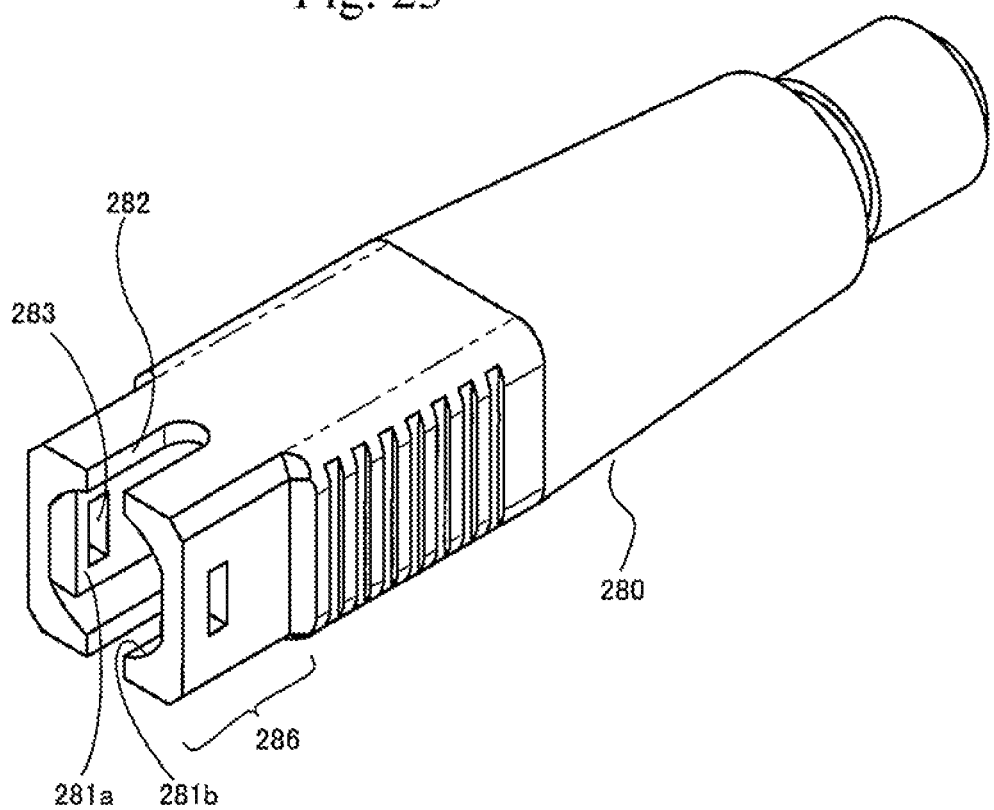
FIG. 23 is a perspective view of the second housing.

FIG. 23 is a perspective view of the second housing.

The front end side of the second housing 280 is almost same as that of the second housing 80. The rear end side is different because the present embodiment does not have the configuration of pressing the outer jacket to support it. In the present embodiment, a vertical wall surface 281a corresponds to the vertical wall surface 81a, a cylindrical surface 281b corresponds to the cylindrical surface 81b, a notch portion 282 corresponds to the notch portion 82, and a recessed engagement portion 283 corresponds to the recessed engagement portion 83.

Figure 24:
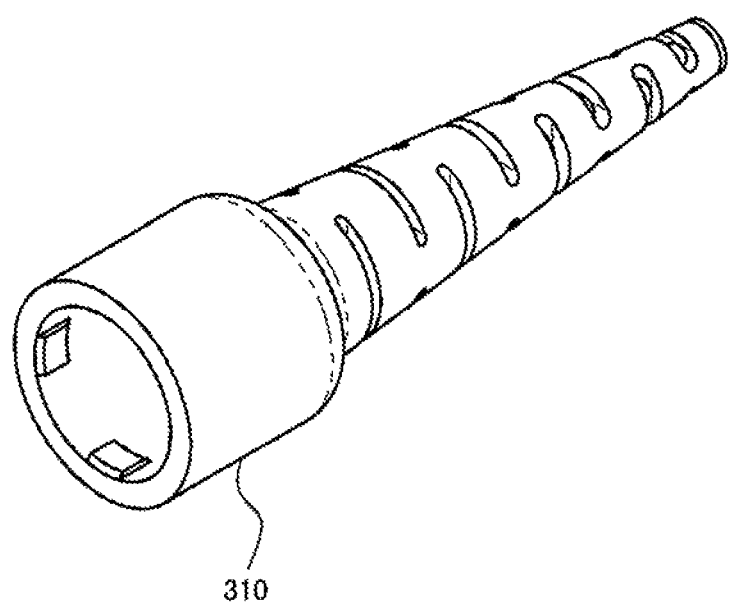
FIG. 24 is a perspective view of the boot.

FIG. 24 is a perspective view of the boot.

The front end of the boot 310 is inserted into the rear end of the second housing 280 to be fitted and fixed to the second housing 280.

Also in the present embodiment, the tubular engagement portion 66 and the engagement receiving portion 286 are fitted to each other, and the first housing portion 10 and the second housing portion 270 are fitted to each other.

Note that, this invention is not limited to the above-mentioned embodiments. Although it is needless to say for those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider based on the known technology as substitutions of the members, the configurations, etc. disclosed in the embodiment are substituted with the above mentioned appropriately or are used by altering its combination.

DESCRIPTION OF THE REFERENCE NUMERALS 10 first housing portion
20 ferrule portion
21 body portion
22 built-in fiber
23 flange portion
30 first housing
31 partition wall
31a through hole
32 opening
33 opening
34 notch portion
40 first fixing member
41 tubular portion
42 lid portion
43 protrusion
44a vertical wall surface
44b cylindrical surface
45 convex portion
50 spring
60 second fixing member
61 flange-shaped portion
62 body portion
63 flat surface portion
64 protrusion
65 cutting portion
70 second housing portion
80 second housing
81 opening
81a vertical wall surface
81b cylindrical surface
82 notch portion
83 recessed engagement portion
85 tubular portion
90 fusion protection sleeve
100 outer jacket fixing member
101 female thread
102 body portion
103 opening
110 boot
111 flange portion
120 outer jacket pressing member
121 notch
130 grip
270 second housing portion
280 second housing
281a vertical wall surface
281b cylindrical surface
282 notch portion
283 recessed engagement portion
286 engagement receiving portion
290 fusion protection sleeve
310 boot

What is claimed is:

1. An optical connector which houses a ferrule portion in a front end side of the optical connector, the optical connector having a fiber connection portion which connects a built-in fiber held by the ferrule portion with an optical fiber exposed by removing an outer jacket, the optical connector comprising:
a first housing portion for housing the ferrule portion; and
a second housing portion for housing the fiber connection portion, the second housing portion being arranged on a rear side of the first housing portion, wherein
the first housing portion and the second housing portion are configured to fit to each other by inserting one of the first housing portion and the second housing portion to the other while aligning in an axial direction and rotating one of the first housing portion and the second housing portion with respect to the other by an angle smaller than one rotation,
one of the first housing portion and the second housing portion has a tubular engagement portion which is formed in a tubular shape projected toward the other of the first housing portion and the second housing portion in the axial direction for inserting the built-in fiber into the tubular engagement portion,
a protrusion protruding to a radius direction is formed on an outer peripheral surface of the tubular engagement portion,
the other of the first housing portion and the second housing portion has an engagement receiving portion which can house the tubular engagement portion, has a protrusion-avoiding portion into which the protrusion can be inserted without causing interference, and has a recessed engagement portion formed on an inner peripheral surface of the engagement receiving portion at a part other than the protrusion-avoiding portion, and the recessed engagement portion is arranged at a position capable of facing the protrusion so that the recessed engagement portion and the protrusion are fitted to each other.

2. The optical connector according to claim 1, wherein a plurality of protrusions is formed on the outer peripheral surface of the tubular engagement portion, and a plurality of protrusion-avoiding portions and a plurality of recessed engagement portions are formed on the engagement receiving portion corresponding to the plurality of protrusions.

3. The optical connector according to claim 1, wherein a small-diameter portion is formed on the inner peripheral surface of the engagement receiving portion to house the tubular engagement portion at a part where the protrusion is not formed, and a large-diameter portion is formed on the inner peripheral surface of the engagement receiving portion, the large-diameter portion having a diameter corresponding to a height of the protrusion of the tubular engagement portion, and the recessed engagement portion is formed on the small-diameter portion.

4. The optical connector according to claim 1, wherein the tubular engagement portion is housed in the first housing portion to be movable within a predetermined range, protruded from an inside of the first housing portion to an outside, and supported in the first housing portion while being energized frontward by an elastic member.

5. The optical connector according to claim 1, further comprising:

a grip which is configured to be attached to cover an outer periphery of the tubular engagement portion and the engagement receiving portion in a state that the tubular engagement portion and the engagement receiving portion are fitted to each other to prevent a rotation of the tubular engagement portion and the engagement receiving portion.

6. The optical connector according to claim 1, wherein the ferrule portion is housed in the first housing portion to be movable within a predetermined range, and a front end of the tubular engagement portion abuts on the ferrule portion and the tubular engagement portion is energized frontward.

7. The optical connector according to claim 1, further comprising:

an outer jacket pressing member which is attached to a rear end of the second housing portion to press the outer jacket to the rear end of the second housing portion; and an outer jacket fixing member which is attached to the rear end of the second housing portion to house the outer jacket pressing member, wherein the outer jacket pressing member presses the outer jacket to a tubular portion arranged at the rear end of the second housing portion, and the outer jacket fixing member is fixed by being screwed into the second housing portion to house the outer jacket pressing member, and tensile strength fibers included in the outer jacket are fixed to the rear end of the second housing portion together with the outer jacket.

\* \* \* \* \*